United States Patent Office 3,264,542
Patented August 2, 1966

3,264,542
MULTI-SPEED SINGLE-PHASE MOTOR
John C. Burdett, Lima, Ohio, assignor to Westinghouse Electric Corporation, Pittsburgh, Pa., a corporation of Pennsylvania
Filed June 28, 1963, Ser. No. 291,583
7 Claims. (Cl. 318—220)

The present invention relates to a multi-speed single-phase electric motor, and more particularly to a multi-speed motor of the permanent split capacitor type utilizing a booster winding to obtain a plurality of speeds.

One well-known method of obtaining a plurality of operating speeds of a single-phase motor involves the use of a booster winding which can be connected in series with the main winding of the motor. Such a motor runs at its highest speed on the main winding alone, and when the booster winding is connected in series with the main winding, the motor is weakened so that when driving a fan or other load having similar torque characteristics, the motor will run at a lower speed. Any number of intermediate speeds can be obtained by connecting the booster winding in sections to obtain a number of different torque characteristics of the motor for operation at different speeds.

In the usual arrangement, the booster winding is wound in the same slots of the stator as the main winding with the sections of the booster winding coinciding in position with the poles of the main winding. One problem with this arrangement is the difficulty of obtaining balanced operation if a number of different speeds are required. If each section of the booster winding consists of two groups of coils lying in slots which are diametrically opposite to each other in physical position in the motor, the magnetic effect on the rotor is balanced and satisfactory operation is obtained.

If the number of speeds other than the high speed does not exceed the number of pairs of poles in the motor, therefore, there is no difficulty in obtaining balanced operation. Thus, in a four pole motor, for example, three speeds can be obtained by connecting in one section two groups of booster winding coils coinciding with two opposite poles of the main winding, and in a second section two groups of booster winding coils coinciding with the other two poles. High-speed operation is then obtained by using the main winding alone, a second speed is obtained by connecting one section of the booster winding in series with the main winding, and a low speed is obtained by connecting both sections of booster winding in series with the main winding, and balanced operation is obtained under all three conditions.

If a greater number of speeds is required, however, it is difficult to obtain balanced operation. Each group of booster winding coils could be separately connected as a winding section to increase the number of speeds, but if this is done, an unbalanced magnetic field results when either one or three sections of the booster winding are connected in the circuit and noisy operation and undesirable bearing wear occur. This problem can be overcome by providing taps in each coil group of the booster winding so that parts of diametrically opposite groups can be connected together to form the desired number of balanced booster sections, but this requires a large number of taps and special connections which add to the cost and complexity of the motor and increase the opportunities for erroneous connection.

Another disadvantage of the conventional arrangement is that the starting torque of the motor is reduced each time an additional section of the booster winding is connected in series. Most fan motors in which this type of multi-speed operation is used are of the permanent split, or capacitor-run type which inherently has a low starting torque so that any reduction in starting torque is a serious disadvantage.

The principal object of the present invention is to provide a multi-speed single-phase motor of the type described in which a larger number of speeds is obtainable with balanced operation than has heretofore been possible without special and complicated connections of the booster winding.

Another object of the invention is to provide a multi-speed single-phase motor of the capacitor-run type in which a relatively large number of speeds is obtainable with balanced operation, and with improved efficiency and starting torque as compared to conventional motors of this type.

A further object of the invention is to provide a multi-speed motor of the type described which is readily adaptable to the use of a separable connector for connecting the motor to the line and in which the connector itself can be used as a speed selector for selecting the desired operating speed of the motor.

Other objects and advantages of the invention will be apparent from the following detailed description, taken in connection with the accompanying drawing, in which.

Figure 1:
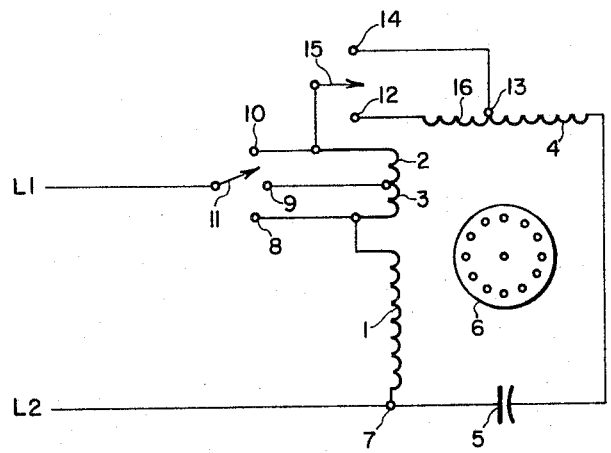
FIGURE 1 is a schematic diagram of a single-phase motor illustrating one embodiment of the invention.

The invention is shown in an illustrative embodiment in FIG. 1 as applied to a multi-speed single-phase motor of the permanent split or capacitor-run type. The motor is shown as having a main primary or stator winding 1, which may have any number of poles, and a booster winding which is shown as having two section 2 and 3. As previously described, the booster winding sections 2 and 3 are preferably wound in the same slots as the main winding 1, and each section consists of two portions or groups of coils positioned diametrically opposite to each other. The motor also has an auxiliary or capacitor winding 4 displaced by ninety electrical degrees from the main winding 1, and a capacitor 5 is connected in series with the auxiliary winding 4 to effect the necessary phase displacement of the current in the auxiliary winding. The motor has a rotor 6 of any suitable type, shown as a squirrel cage rotor, and the motor itself may be of any desired or usual physical construction.

The main and auxiliary windings are connected together in parallel during operation, and one end of the main winding 1 and the capacitor 5 are connected together to a terminal 7 for connection to one side of a single-phase line L1, L2. The other end of the main winding 1 is connected to one end of the booster winding section 3 and to a terminal 8 for connection to the other side of the line. The other end of the booster winding section 3 is connected to one end of the booster winding section 2 and to terminal 9, and the other end of the booster winding section 2 is connected to a terminal 10. A selector switch means 11 of any suitable type is provided for connecting the line to any one of the terminals 8, 9 and 10.

The free end of the auxiliary winding 4 is connected to a terminal 12, and a tap connection 13 in the auxiliary winding 4 is connected to a terminal 14. A selector switch means 15 of any suitable type is provided for connecting either one of the terminals 12 or 14 to the terminal 10, as shown. The tap 13 is provided for the purpose of cutting out a section 16 of the auxiliary winding 4. The section 16 of the auxiliary winding 4 preferably consists of two similar portions of the winding phyiscally located in diametrically opposite positions on the stator to insure balanced operation when the section 16 is cut out.

Multi-speed operation of this motor is obtained by the use of different combinations of the booster winding and the tapped auxiliary winding. The motor is preferably designed so that the main winding 1 is used alone for high-speed operation, by placing the switch 11 on terminal 8, the maximum permissible voltage on the capacitor 5 will be produced with the tap connection 13 of the auxiliary winding connected to the line by placing the switch 15 on the terminal 14, the main and booster windings acting, in effect, as an autotransformer for the auxiliary winding circuit. For the next lowest speed, the section 3 of the booster winding is added in series with the main winding by placing the switch 11 on terminal 9. This reduces the torque developed by the motor, so that the speed decreases when driving a fan, and also tends to decrease the capacitor voltage. By using the full auxiliary winding, however, with the switch 15 on terminal 12, the capacitor voltage is increased, thus raising the starting torque and improving the efficiency, so that operation at a lower speed is obtained but without seriously impairing the starting torque or efficiency. Additional still lower speeds are obtained by adding the second section 2 of the booster winding and by using either the full auxiliary winding or the tap connection 13. The particular motor shown in FIG. 1 is a five-speed motor, the different speeds being obtained by changing the booster winding and auxilary winding connections as indicated in the following tabulation which shows the terminals to be connected to the line by the switches 11 and 15 for each speed.

| Speed | Switch 11 | Switch 15 |
| --- | --- | --- |
| High | 8 | 14 |
| Medium High | 9 | 12 |
| Medium | 9 | 14 |
| Medium Low | 10 | 12 |
| Low | 10 | 14 |

It will be noted that in the illustrated embodiment, five speeds are obtainable with only two sections of booster winding and without requiring any taps in the booster winding sections themselves or any unduly complicated connections. It will also be noted that relatively high starting torques are obtainable even on the lower speed connections, as compared to conventional motors. A very desirable multi-speed motor arrangement is thus obtained which avoids the limitations inherent in the arrangements previously used and makes possible balanced operation at all speeds, since the two sections of the booster winding are arranged as previously described in diametrically opposed portions.

The use of two booster sections is particularly suitable for a four pole motor in which each section of the booster winding can consist of two portions placed diametrically opposite and coinciding with poles of the main winding 1. If the motor has more than four poles, additional balanced sections of booster winding can easily be provided to increase the number of speeds obtainable. It will also be noted that in the five-speed arrangement shown, a sixth speed might be obtained by connecting the terminal 8 to the line for operation on the main winding 1 alone and connecting the switch 15 to the terminal 12. In most cases, this would result in too high a voltage on the capacitor 5 so that it could not be used, but in some cases where the high speed is not too high, a still higher speed can be obtained in this way if the maximum permissible capacitor voltage is not exceeded. The speed selecting switching means 11 and 15 have been shown diagrammatically as selector switches to illustrate the connections of the motor but any suitable type of switching or connecting means can be used which will permit the connections to the line to be made as described. With slight modifications, however, the multi-speed motor described is readily adaptable for use with a speed-selecting separable connector of the type disclosed and claimed in a copending application of G. H. Sherer, Serial No. 165,870 now Patent Number 3,210,578, filed January 12, 1962. As more fully described in that application, and as indicated hereinafter, such a connector consists of a first member mounted on the motor itself and having terminal means connected to the motor windings and a second member connected to the line and engageable with the first member in a plurality of positions each of which completes the connections of the motor to the line for one particular speed, so that the operating speed is determined by the position of the members of the separable connector with respect to each other.

Figure 2:
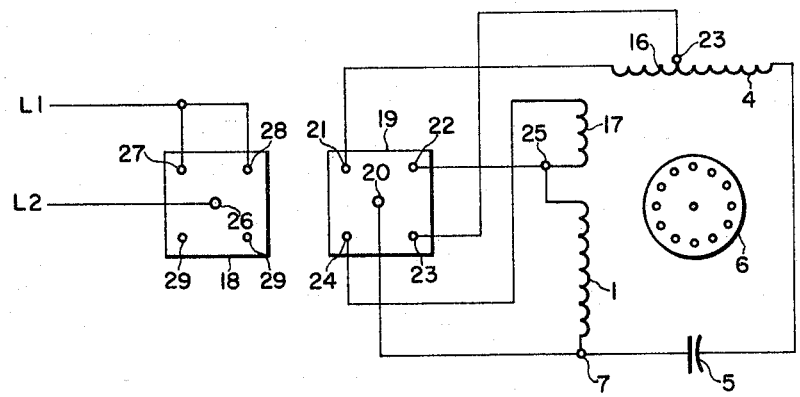
FIG. 2 is a similar diagram showing a slightly modified embodiment of the invention adaptable for use with a speed selecting separable connector.

FIG. 2 shows an embodiment of the invention arranged for use with a speed-selecting connector of this type. The motor of FIG. 2 is generally similar to that of FIG. 1 and corresponding elements are designated by the same reference numerals. Thus, the motor of FIG. 2 has a main winding 1 and an auxiliary winding 4 connected in series with a capacitor 5 and having a tap connection 13 as previously described. The motor of FIG. 2 is a four-speed motor and has a booster winding 17 consisting of only one section which may consist of two diametrically opposite portions, as previously described, although portions of the booster winding could be placed on all poles of the main winding if desired. The arrangement and operation of the motor of FIG. 2 are essentially the same as previously described in connection with FIG. 1, and the circuit of the motor differs only in that the auxiliary winding is connected directly to the line instead of being connected through the booster winding as in FIG. 1.

The motor connections are shown in detail in FIG. 2, including the connections of the separable connector. The connector consists of two members 18 and 19 and may be of any suitable construction, such as that described in detail in the above-mentioned copending application. The fixed member 19 of the separable connector is preferably mounted directly on the motor and permanently connected to the motor windings. The connector member 19 has a central terminal member 20 connected to the common terminal 7 of the main and auxiliary winding circuits. The connector member 19 also has four outer terminal members 21, 22, 23 and 24 symmetrically disposed around the central terminal 20. Since there are four outer terminals in this embodiment, they are placed as shown at the corners of a square in position to be engaged by terminal members on the other connector member 18. Two diagonally opposite terminal members 21 and 23 are connected to the free end of the auxiliary winding 4 and to the tap 13 of the auxiliary winding, respectively. The outer terminal member 22 is connected to the junction 25 between the main winding 1 and booster winding 17, and the terminal member 24 is connected to the other end of the booster winding 17.

The removable member 18 of the separable connector has a central terminal 26 connected to one side of a single-phase line L1, L2. The connector member 18 has two outer terminals 27 and 28 which are connected together and to the other side of the line. The member 18 also has two unconnected or dummy outer terminals 29 and the four outer terminals of the connector member 18 are disposed at the corners of a square, as shown in corresponding positions to the terminal members of the connector member 19. The connector members 18 and 19 may be molded of suitable insulating material with terminal members of any suitable type embedded or supported in the connector members.

It will be seen that the connector member 18 is engageable with the connector member 19 in any one of four positions, and that the central terminals 20 and 26 are engaged in any of these positions so that the common terminal 7 of the motor is always connected to one side of the line while the other side of the line is connected to two of the other leads from the motor windings, depending on the position of the connector member 18 with respect to the member 19. Thus, if the members of the saparable connector are engaged in the relative positions shown in FIG. 2, with the terminals 21 and 28 engaged and the terminals 22 and 27 engaged, it will be seen that the main winding 1 and the full auxiliary winding 4 are connected to the line. This is the high-speed connection of the motor with maximum voltage applied to the capacitor 5.

The next lower speed is obtained by rotating the connector member 18 ninety degrees so that the terminals 27 and 28 engage the terminals 22 and 23 of the connector member 19. In this position the main winding terminal 25 is still connected to the line for operation on the main winding alone, but the tap 13 of the auxiliary winding 4 is connected to the line so that the capacitor voltage is reduced and the motor is weakened for operation at a lower speed. A still lower speed is obtained by rotating the connector member 18 in the opposite direction so that the terminals 27 and 28 engage the terminals 21 and 24. In this position, the booster winding 17 is connected to the line, in series with the main winding 1, and the full auxiliary winding 4 is connected to the line. The addition of the booster winding weakens the motor still more, so that its speed is further reduced, while the use of the full auxiliary winding increases the capacitor voltage so that the starting torque is not seriously decreased.

For the fourth or lowest speed, the connector member 18 is rotated 180° from the position shown in the drawing so that the terminals 27 and 28 engage the terminals 23 and 24. In this position, the booster winding 17 is again connected to the line but the tap 13 of the auxiliary winding 4 is now connected to the line so that the motor is further weakened and runs at its lowest speed. Thus, a four-speed motor is provided which requires only one section of booster winding and in which the desired speed is readily selected by means of the separable connector means which also serves to connect the motor to the line.

Figure 3:
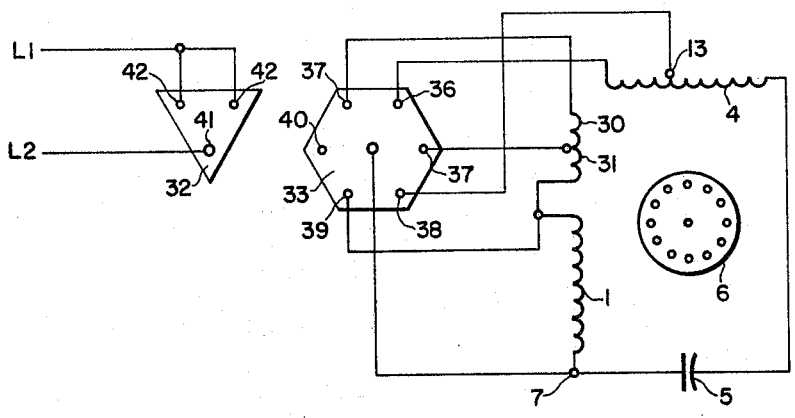
FIG. 3 is a diagram similar to FIG. 2 showing a further modification of the invention.

A further modification of the invention is shown in FIG. 3 in which the motor is arranged to provide better starting torque on the lowest speed in a four-speed motor. In this modification, the motor is similar to that of FIG. 1 with a booster winding which consists of two sections 30 and 31, each of which, as previously described, consists of two diametrically opposite portions to obtain balanced operation. This motor is also arranged for use with a separable speed-selecting connector which may be generally similar to that described in connection with FIG. 2 but which utilizes six terminal members on the stationary member of the connector.

As shown in FIG. 3, the separable connector consists of a removable member 32 and a fixed member 33 mounted on the motor. The fixed member 33 has a central terminal member 34 connected to the common terminal 7 of the motor. In this embodiment, five outer terminal members are required and, for convenience, a hexagonal arrangement of the terminal members is utilized with six terminal members 35, 36, 37, 38, 39 and 40, the terminal 40 being unused in this embodiment. As shown in the drawing, the outer terminal 35 is connected to the free end of the booster winding section 30, the terminal 36 is connected to the free end of the auxiliary winding 4, the terminal 37 is connected to the junction between the two booster winding sections 30 and 31, the terminal 38 is connected to the tap 13 of the auxiliary winding 4, and the terminal 39 is connected to the junction between the main winding 1 and the booster winding section 31.

The separable connector member 32 has a terminal member 41 connected to one side of a single-phase line L1, L2 and adapted to be engaged with the central terminal 34 of the connector member 33. The connector member 32 has two outer terminal members 42 positioned with respect to the terminal 41 so that when the terminal 41 is engaged with the central terminal 34, the outer terminals 42 may be engaged with any two adjacent outer terminals of the connector member 33. The two terminal members 42 are connected together and to the other side of the single-phase line. Since only three terminals are required on the connector member 32, it is shown as being triangular in shape to facilitate engagement with the connector member 33 in any one of a plurality of positions.

The motor is connected to the line for operation at a desired speed by engaging the connector member 32 with the connector member 33 in any one of four positions to obtain any one of the four speeds. For high-speed operation, the connector member 32 is engaged with the connector member 33 in a position such that the terminals 42 engage the terminals 38 and 39 of the connector member 33, the central terminals 34 and 41 also being engaged. In this position, it will be seen that the main winding 1 and the tap connection 13 of the auxiliary winding are connected to the line so that the motor operates at high speed on the main winding 1 alone. For a lower speed, the connector member 32 is engaged with the connector 33 so that the terminals 42 engage the terminals 36 and 37. In this position, the first section 31 of the booster winding is connected to the line in series with the main winding and the full auxiliary winding is connected to the line. The motor is, therefore, weakened so as to run at a lower speed but the capacitor voltage is increased by using the full auxiliary winding to maintain good starting torque.

For a still lower speed, the connector 32 is positioned to engage the terminals 42 with the terminals 37 and 38. In this position, the booster winding section 31 is still connected to the line but the tap connection of the auxiliary winding is connected to the line so that the motor is further weakened and runs at a lower speed. For the lowest speed, the connector member 32 is positioned so that the terminals 42 engage terminals 35 and 36. In this position, both sections of the booster winding are connected to the line in series with the main winding but the full auxiliary winding is connected to the line so that the capacitor voltage is increased and improved starting torque is thus obtained even at the lowest operating speed. If desired, a still lower fifth speed might be obtained by using both sections of the booster winding and the tap connection of the auxiliary winding although the starting torque would be reduced.

It will now be apparent that a multi-speed single-phase motor has been provided in which a plurality of speeds is obtained by the use of booster windings but the number of speeds obtainable, without taps in the booster windings and undue complication of connections, is substantially increased as compared to conventional arrangements. It will also be seen that the starting torque and efficiency of the motor at the lower operating speeds are considerably improved, as compared to conventional motors, by the use of the tapped auxiliary winding. The new motor is also readily adaptable to the use of the particular type of separable connector disclosed for the purpose of making the connections for the different operating speeds, although any suitable type of connecting or switching means might be used.

Certain specific embodiments of the invention have been shown and described for the purpose of illustration, but it will be apparent that various other arrangements of the winding are possible to obtain any desired number of speeds and that the invention is adaptable to motors of any type or number of poles. It is to be understood, therefore, that the invention is not limited to the specific arrangements shown but includes all equivalent modifications and embodiments.

I claim as my invention:

1. A multi-speed single-phase induction motor having a main primary winding, a booster winding having at least one section connected in series with the main winding, an auxiliary winding circuit including an auxiliary primary winding and a capacitor connected in series therewith, said auxiliary winding having a terminal connection and a tap connection, and means for connecting the main winding and the auxiliary winding circuit in parallel to a single-phase line, said connecting means including means for alternatively connecting the main winding alone or with one or more sections of the booster winding in series therewith and for connecting either the terminal connection or the tap connection of the auxiliary winding, to obtain operation of the motor at any one of a plurality of speeds.

2. A multi-speed single-phase induction motor having a main primary winding, a booster winding having a plurality of sections connected in series with the main winding, an auxiliary winding circuit including an auxiliary winding and a capacitor in series therewith, said auxiliary winding having means for cutting out a section of the winding, and means for connecting the main winding and the auxiliary winding circuit in parallel to a single-phase line, said connecting means including means for alternatively connecting the main winding alone or with one or more sections of the booster winding in series therewith and for connecting the auxiliary winding either with or without said section, to obtain operation of the motor at any one of a plurality of speeds.

3. A multi-speed single-phase induction motor having a main primary winding circuit including a main winding and a booster winding having at least one section connected in series with the main winding, an auxiliary winding circuit including an auxiliary winding and a capacitor connected in series therewith, said auxiliary winding having a terminal connection and a tap connection, and means for connecting the main and auxiliary winding circuits to a single-phase line, said connecting means including means for alternatively connecting the main winding to the line alone or with one or more sections of the booster winding in series therewith and for connecting either the terminal connection or the tap connection of the auxiliary winding to the booster winding, for operation of the motor at any one of a plurality of speeds.

4. A multi-speed single-phase induction motor having a main primary winding circuit including a main winding and a booster winding having at least one section connected in series with the main winding, an auxiliary winding circuit including an auxiliary winding and a capacitor connected in series therewith, said auxiliary winding having a terminal connection and a tap connection, and means for connecting the main and auxiliary winding circuits to a single-phase line, said connecting means including speed selector means for effecting connection of one side of the line to the main winding either alone or with one or more sections of the booster winding in series therewith and for effecting connection of either the terminal connection or the tap connection of the auxiliary winding to the booster winding, for operation of the motor at any one of a plurality of speeds.

5. A multi-speed single-phase induction motor having a main primary winding circuit including a main winding and a booster winding having at least one section connected in series with the main winding, an auxiliary winding circuit including an auxiliary winding and a capacitor in series therewith, said auxiliary winding having a terminal connection and a tap connection, and means for connecting the main and auxiliary winding circuits in parallel to a single-phase line, said connecting means including means for connecting one side of said line alternatively to either the main winding alone or to one or more of the sections of the booster winding in series with the main winding and for alternatively connecting said one side of the line to either the terminal connection or the tap connection of the auxiliary winding.

6. A multi-speed single-phase induction motor having a main primary winding circuit including a main winding and a booster winding having at least one section connected in series with the main winding, an auxiliary winding circuit including an auxiliary winding and a capacitor in series therewith, said auxiliary winding having a terminal connection and a tap connection, and means for connecting the main and auxiliary winding circuits in parallel to a single-phase line, said connecting means including speed selector means for connecting one side of the line to either the terminal connection or the tap connection of the auxiliary winding and to either the main winding alone or one or more sections of the booster winding in series with the main winding.

7. A multi-speed single-phase induction motor having a main primary winding circuit including a main winding and a booster winding having at least one section connected in series with the main winding, an auxiliary winding circuit including an auxiliary winding and a capacitor in series therewith, said auxiliary winding having a terminal connection and a tap connection, and means for connecting the main and auxiliary winding circuits in parallel to a single-phase line, said connecting means comprising a separable connector having a first member and a second member, said first member having central terminal means connected to one end of the main winding and one end of the auxiliary winding circuit, said first member having a plurality of outer terminal means symmetrically disposed about the central terminal means, two of said outer terminal means being connected to the terminal connection and the tap connection of the auxiliary winding, and others of the outer terminal means being connected to the main winding and to the sections of the booster winding, and said second member of the separable connector having terminal means for connection to one side of a single-phase line and positioned to engage the central terminal means of the first member and having two other terminal means connected together for connection to the other side of the line and positioned to engage any two of the outer terminal means of the first member.

References Cited by the Examiner

UNITED STATES PATENTS

| | | | |
|---|---|---|---|
| 1,726,230 | 8/1929 | Kennedy | 318—221 |
| 1,726,232 | 8/1929 | Kennedy | 318—220 |
| 2,310,874 | 2/1943 | Schiff | 318—225 |
| 3,210,578 | 10/1965 | Sherer | 310—71 |

ORIS L. RADER, *Primary Examiner.*

G. FRIEDBERG, *Assistant Examiner.*